(12) United States Patent
Xiang et al.

(10) Patent No.: US 10,948,124 B2
(45) Date of Patent: Mar. 16, 2021

(54) DESKTOP DISPLAY STAND BASE AND ITS APPLICATION TO A DESKTOP DISPLAY STAND ASSEMBLY THEREOF

(71) Applicant: Loctek Inc., Livermore, CA (US)

(72) Inventors: Lehong Xiang, Ningbo (CN); Haoyu Ye, Ningbo (CN)

( * ) Notice: Subject to any disclaimer, the term of this patent is extended or adjusted under 35 U.S.C. 154(b) by 0 days.

(21) Appl. No.: 16/373,631

(22) Filed: Apr. 3, 2019

(65) Prior Publication Data

US 2020/0063911 A1 Feb. 27, 2020

(30) Foreign Application Priority Data

Aug. 21, 2018 (CN) .......................... 201810954975.6

(51) Int. Cl.
*F16M 11/12* (2006.01)
*G06F 1/16* (2006.01)
*H02J 7/02* (2016.01)

(52) U.S. Cl.
CPC ......... *F16M 11/126* (2013.01); *G06F 1/1632* (2013.01); *H02J 7/025* (2013.01); *F16M 2200/08* (2013.01)

(58) Field of Classification Search
CPC .............. F16M 11/126; F16M 2200/08; G06F 1/1632; H02J 7/025
See application file for complete search history.

(56) References Cited

U.S. PATENT DOCUMENTS

| | | | |
|---|---|---|---|
| 9,577,467 B1* | 2/2017 | Karanikos | H02J 7/025 |
| 9,844,159 B1* | 12/2017 | Liniger | G06F 1/1632 |
| 2015/0237750 A1* | 8/2015 | Yang | F16M 11/041 |
| | | | 206/45.2 |
| 2020/0015585 A1* | 1/2020 | Ren | F21V 33/0012 |

* cited by examiner

*Primary Examiner* — Anita M King
(74) *Attorney, Agent, or Firm* — W&K IP

(57) ABSTRACT

The present disclosure discloses a desktop display stand base, comprising a fixing device connected to the desktop and a seat body respectively connected to the fixing device and the display stand, wherein a wireless charging device for mobile phones is provided on one side of the seat body, the side of which close to the user; the wireless charging device is hinged to the seat body and can be locked at any angle, and the hinge point is located on the side close to the user. In this way, the user can monitor the information on the mobile phone screen while the phone being charged.

9 Claims, 3 Drawing Sheets

DESKTOP DISPLAY STAND BASE AND ITS APPLICATION TO A DESKTOP DISPLAY STAND ASSEMBLY THEREOF

CROSS-REFERENCE TO RELATED APPLICATIONS

This application claims priority to Chinese Patent Application No. 201810954975.6 with a filing date of Aug. 21, 2018. The content of the aforementioned applications, including any intervening amendments thereto, are incorporated herein by reference.

TECHNICAL FIELD

The present disclosure relates to the technical field of office furniture, in particular to a desktop display stand base and its application to a desktop display stand assembly thereof.

BACKGROUND

A computer display is considered as an important component of a computer. A desktop display stand is the main device used to support and secure a computer display to a desktop, and it comprises a base and a supporting arm; the base is usually of circular, square or other shapes. With single-functional design, the display stand in the prior art only plays a role of stabilizing and supporting the display. However, more and more office and school products, especially mobile phones and other electronic products are usually placed on the desktop nowadays, resulting in the disorder of the desktop and affecting the efficiency of work and study. In addition, the electronic products such as mobile phones are power-consuming, and need to be connected to another power supply to be charged when running out of battery. As a result, the mobile phones and other electronic products may not be used simultaneously while charging due to the distance between the power supply source and the desktop, meanwhile, additional data lines and power lines may appear on the desktop, which further affect the environment for work and study.

SUMMARY

One objective of the present disclosure is to solve the technical problem by providing a desktop display stand base and its application to a desktop display stand assembly thereof, so that the office and learning environment is more orderly and tidy, and further improve the efficiency of work and study.

In order to solve the above mentioned technical problem, the present disclosure provides a desktop display stand base, comprising a fixing device connected to the desktop and a seat body respectively connected to the fixing device and the display stand; a wireless charging device for mobile phones is provided on one side of the seat body, the side of which close to the user; the wireless charging device is hinged to the seat body and can be locked at any angle, and the hinge point is located on the side close to the user.

With the above described structure, the present disclosure has the following advantages compared with the prior art: a wireless charging device is installed on the base of the display stand, on which the mobile phone can be placed during work and study, thus the user can monitor the information displayed on the mobile phone while charging. The desktop looks clean and tidy and the efficiency of work and study is improved without all the data lines, power lines and other accessories for charging. In addition, the wireless charging device is hinged to the seat body and can be locked at any angle; therefore, the angle between the wireless charging device and the seat body can be adjusted at any time, which further enables the adjustment of the angle between the mobile phone screen and the user, so that the user is provided with more visual conveniences when watching the mobile phone screen.

In one embodiment, a containing space is formed in the seat body, and the wireless charging device is accommodated in the containing space when the wireless charging device and the seat body are folded; the wireless charging device is hinged to the side wall of the containing space, the side of which close to the user. The wireless charging device is embedded in the seat body in this structure, and the wireless charging device is completely combined with the seat body when the wireless charging device is in a closed state, makes it compact and safe.

In one embodiment, the wireless charging device comprises a bottom plate and a wireless charging module, wherein the bottom plate comprises a bottom board and a side surrounding plate which is enclosed into a circle along the edge of the bottom board and is integrally connected with the edge of the bottom board; the bottom board and the side surrounding plate form a concave cavity, and the wireless charging module is embedded in the concave cavity, and the bottom plate is rotationally connected with the seat body. In this structure, the bottom plate can be used for better accommodating and protecting the wireless charging module; only the rotating adjustment between the bottom plate and the seat body is needed, and the service life of the wireless charging module is prolonged.

In a further embodiment, an upward extending baffle used for blocking the mobile phone from sliding out of the wireless charging module when obliquely placed is provided on the edge of the side surrounding plate, the side of which close to the user. The setting of the baffle solves the problem of mobile phone sliding when the wireless charging device is tilted, thus the mobile phone can be better protected and more effectively charged.

In a further embodiment, the shape of the containing space in the seat body is circular, and the bottom plate of the wireless charging module is of circular shape correspondingly. The round design makes the contour of the product smoother, and the user can be prevented from being injured by sharp corners and the like.

In a further embodiment, the power wire of the wireless charging module at the connection point of the rotation connection is connected with the power supply after sequently passing through the side wall of the bottom plate and the inner space of the seat body. By wiring from the inside of the seat body, no wires are exposed outside the display stand; on the one hand, the wires are protected from external damage, and on the other hand, the entire display stand appears neat and tidy.

In a further embodiment, a lamp strip is embedded around the peripheral wall of the outer side of the bottom plate of the wireless charging device along the circumferential direction. The arrangement of the lamp strip provides a prompt function when the wireless charging device is charging to improve the visual experience of the user.

In one embodiment, the seat body is provided with a charging indicator which is electrically connected with the wireless charging device. The setting of the charging indicator provides a prompt function when the wireless charging device is charging, and makes the user experience more intuitive.

In order to solve the above technical problem, the present disclosure provides a desktop display stand assembly, comprising a fixing device connected to the desktop, a display stand and a seat body respectively connected to the fixing device and the display stand, wherein the desktop display stand assembly further comprises a tabletop display stand base according to any claim of claims 1-8.

With the above described structure, the present disclosure has the following advantages compared with the prior art: a wireless charging device is installed to the base of the display stand, on which the mobile phone can be placed during work and study, thus the user can monitor the information displayed on the mobile phone while charging. The desktop looks clean and tidy and the efficiency of work and study is improved without all the data lines, power lines and other accessories for charging. In addition, the wireless charging device is hinged to the seat body and can be locked at any angle; therefore, the angle between the wireless charging device and the seat body can be adjusted at any time, which further enables the adjustment of the angle between the mobile phone screen and the user, so that the user is provided with more visual conveniences when watching the mobile phone screen.

Figure 1:
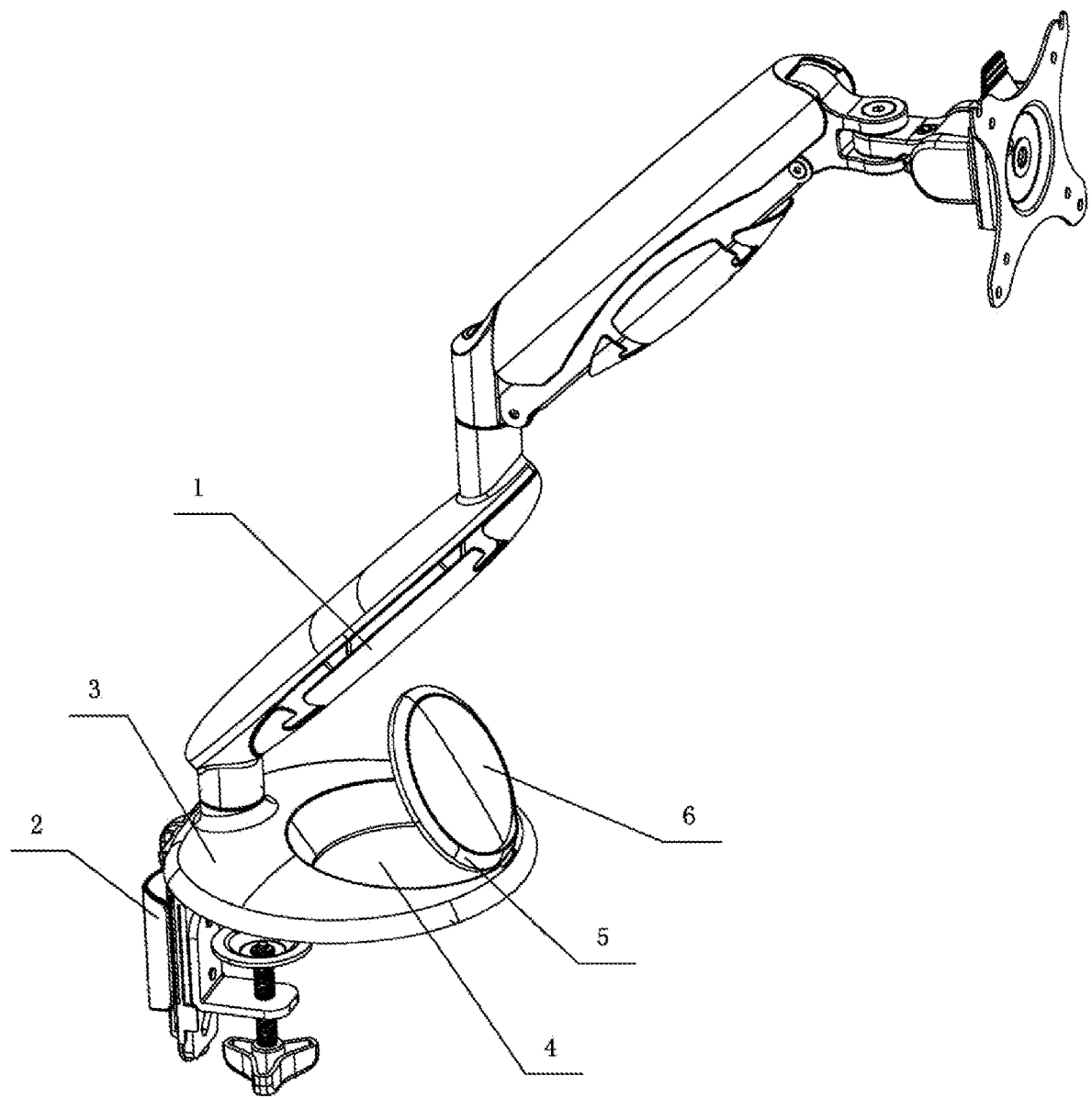
FIG. 1 is a schematic structural diagram of the desktop display stand assembly of the present disclosure.
Figure 2:
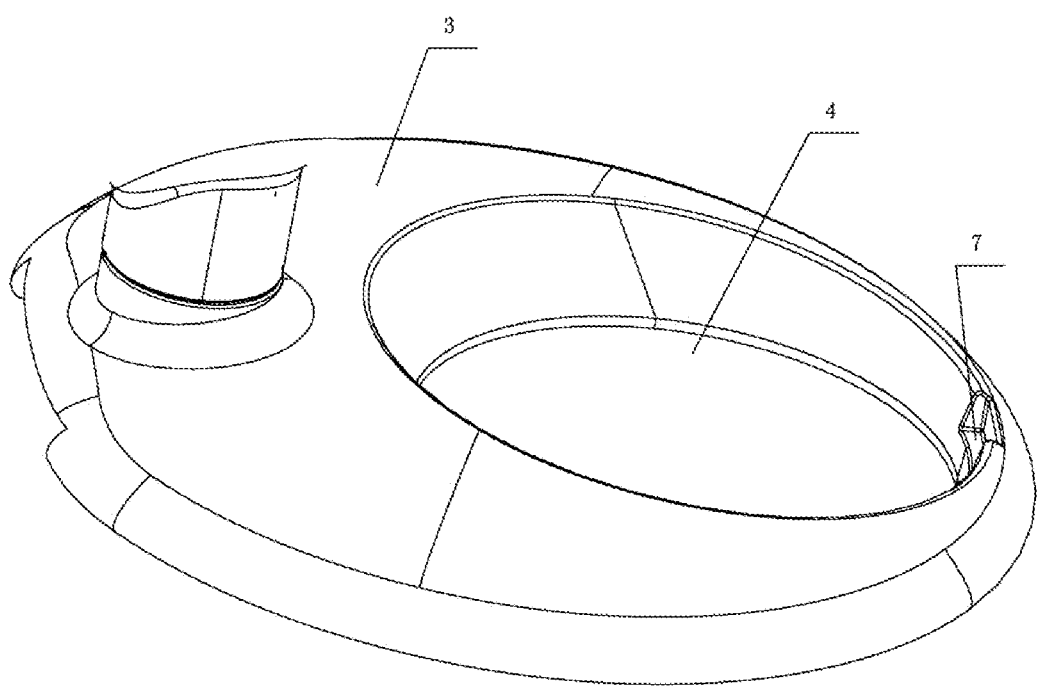
FIG. 2 is a schematic structural diagram of the seat body of the present disclosure.
Figure 3:
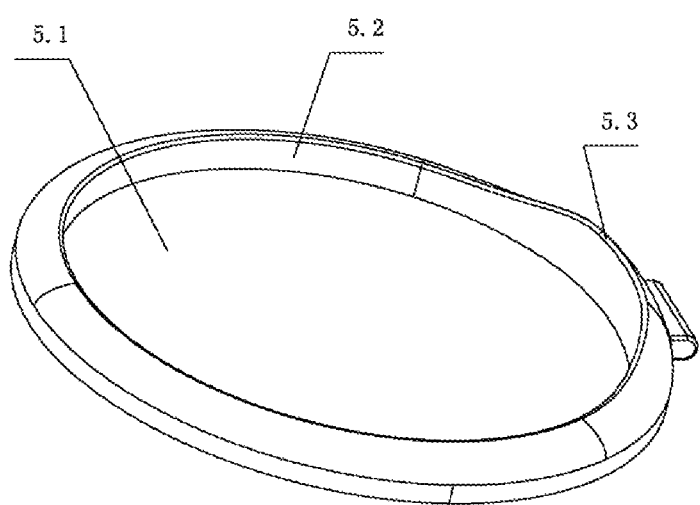
FIG. 3 is a schematic structural diagram of the bottom plate of the present disclosure.

Among them: 1, display stand; 2, fixing device; 3, seat body; 4, containing space; 5, bottom plate; 5.1, bottom board; 5.2, side surrounding plate; 5.3, baffle; 6, wireless charging module; 7, notch.

DETAILED DESCRIPTION

Various aspects of the illustrative embodiments of the present disclosure will be described herein using terms commonly employed by those skilled in the art. As shown in the schematic structural diagrams of the desktop display stand base, the base comprises the fixing device 2 connected to the desktop and the seat body 3 respectively connected to the fixing device 2 and the display stand 1, a wireless charging device for mobile phones is provided on one side of the seat body 3, the side of which close to the user; the wireless charging device is hinged to the seat body 3 and can be locked at any angle, and the hinge point is located on the side close to the user.

The containing space 4 is formed in the seat body 3, and the wireless charging device is accommodated in the containing space 4 when the wireless charging device and the seat body 3 are folded; the wireless charging device is hinged to the side wall of the containing space 4, the side of which close to the user.

The wireless charging device comprises a bottom plate 5 and a wireless charging module 6, the bottom plate 5 comprises a bottom board 5.1 and a side surrounding plate 5.2 which is enclosed into a circle along the edge of the bottom board 5.1 and is integrally connected with the edge of the bottom board 5.1; the bottom board 5.1 and the side surrounding plate 5.2 form a concave cavity, and the wireless charging module 6 is embedded in the concave cavity; the bottom plate 5 is rotationally connected with the seat body 3.

The upward extending baffle 5.3 used for blocking the mobile phone from sliding out of the wireless charging module 6 when the mobile phone is obliquely placed is provided on the edge of the side surrounding plate 5.2, the side of which close to the user.

The shape of the containing space 4 in the seat body 3 is circular, and the bottom plate 5 of the wireless charging module 6 is of circular shape correspondingly.

The power wire of the wireless charging module 6 at the connection point of the rotation connection is connected with the power supply after sequently passing through the side wall of the bottom plate 5 and the inner space of the seat body 3.

The lamp strip is embedded around the peripheral wall of the outer side of the bottom plate 5 of the wireless charging device along the circumferential direction. An annular groove is formed in the peripheral wall of the outer side of the bottom plate 5 in the circumferential direction, the lamp strip is embedded in the groove, and the lamp strip is electrically connected with the wireless charging module 6. It can be set to indicate that charging is in progress when the lamp strip is on, and that charging is completed when the lamp strip is not lit. Or vice versa.

The seat body 3 is provided with a charging indicator which is electrically connected with the wireless charging device. The charging indicator installed on the seat body 3 is electrically connected with the wireless charging module 6. It can be set to indicate that charging is in progress when the charging indicator appears red, and that charging is completed when the charging indicator appears green.

When referring the wireless charging device is hinged to the seat body 3, it means the containing space 4 matched with the shape of the wireless charging device is formed in the seat body 3; a notch 7 is formed in the side wall of the containing space 4, the side of which close to the user; the wireless charging device is rotationally connected to the seat body 3 at the notch 7 through a connecting shaft.

The structure of locking at any angle between the wireless charging device and the seat body can be a common locking structure in the market, such as a transmission connection with the gear, or a gear pair can be arranged on the connecting shaft and the bottom plate at the hinged point. It can also be a ratchet transmission structure; a ratchet is mounted on the bottom plate at the hinged point, and a pawl is telescopically mounted on the seat body; the angle is adjusted and locked when the pawl is meshed with the ratchet, and the wireless charging device can be reset when the pawl is pulled out; the pawl is meshed with the ratchet again when the pawl is reset by the reset spring and the like.

As shown in the schematic structural diagrams of the desktop display stand assembly, the assembly comprises the fixing device 2 connected to the desktop, the display stand 1 and the seat body 3 respectively connected to the fixing device 2 and the display stand 1, the wireless charging device for mobile phones is provided on one side of the seat body 3, the side of which close to the user; the wireless charging device is hinged to the seat body 3 and can be locked at any angle, and the hinge point is located on the side close to the user.

The containing space 4 is formed in the seat body 3, and the wireless charging device is accommodated in the containing, space 4 when the wireless charging device and the seat body 3 are folded; the wireless charging device is hinged to the side wall of the containing space 4, the side of which close to the user.

The wireless charging device comprises a bottom plate 5 and a wireless charging module 6, the bottom plate 5 comprises a bottom board 5.1 and a side surrounding plate 5.2 which is enclosed into a circle along the edge of the bottom board 5.1 and is integrally connected with the edge of the bottom board 5.1; the bottom board 5.1 and the side surrounding plate 5.2 form a concave cavity, and the wireless charging module 6 is embedded in the concave cavity; the bottom plate 5 is rotationally connected with the seat body 3.

The upward extending baffle 5.3 used for blocking the mobile phone from sliding out of the wireless charging module 6 when the mobile phone is obliquely placed is provided on the edge of the side of the surrounding plate 5.2, the side of which close to the user.

The shape of the containing space 4 in the seat body 3 is circular, and the bottom plate 5 of the wireless charging module 6 is of circular shape correspondingly.

The power wire of the wireless charging module 6 at the connection point of the rotation connection is connected with the power supply after sequently passing through the side wall of the bottom plate 5 and the inner space of the seat body 3.

A lamp strip is embedded around the peripheral wall of the outer side of the bottom plate 5 of the wireless charging device along the circumferential direction. An annular groove is formed in the peripheral wall of the outer side of the bottom plate 5 in the circumferential direction, the lamp strip is embedded in the groove, and the lamp strip is electrically connected with the wireless charging module 6. It can be set to indicate that charging is in progress when the lamp strip is on, and that charging is completed when the lamp strip is not lit. Or vice versa.

The seat body 3 is provided with a charging indicator which is electrically connected with the wireless charging device. The charging indicator installed on the seat body 3 is electrically connected with the wireless charging module 6. It can be set to indicate that charging is in progress when the charging indicator appears red, and that charging is completed when the charging indicator appears green.

When referring the wireless charging device is hinged to the seat body 3, it means the containing space 4 matched with the shape of the wireless charging device is formed in the seat body 3; a notch 7 is formed in the side wall of the containing space 4, the side of which close to the user; the wireless charging device is rotationally connected to the seat body 3 at the notch 7 through a connecting shaft.

The structure of locking at any angle between the wireless charging device and the seat body can be a common locking structure in the market, such as a transmission connection with the gear, or a gear pair can be arranged on the connecting shaft and the bottom plate at the hinged point. It can also be a ratchet transmission structure; a ratchet is mounted on the bottom plate at the hinged point, and a pawl is telescopically mounted on the seat body; the angle is adjusted and locked when the pawl is meshed with the ratchet, and the wireless charging device can be reset when the pawl is pulled out; the pawl is meshed with the ratchet again when the pawl is reset by the reset spring and the like.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

We claim:

1. A desktop display stand base, comprising: a fixing device connected to a desktop and a seat body respectively connected to the fixing device and a display stand, wherein a wireless charging device for mobile phones is provided on one side of the seat body, the side of which close to a user; the wireless charging device is hinged to the seat body and can be locked at any angle, and the hinge point is locatable on the side close to the user; the wireless charing device comprises a bottom plate and a wireless charging module; the bottom plate comprises a bottom board and a side surrounding plate which is enclosed into a circle along an edge of the bottom board and is integrally connected with the edge of the bottom board; the bottom board and the side surrounding plate form a concave cavity; the wireless charging module is embedded in the concave cavity, and the bottom plate is rotationally connected with the seat body; and an upward extending baffle used for blocking the mobile phone from sliding out of the wireless charging module when the mobile phone is obliquely placed is provided on the edge of the side surrounding plate, the side of which close to the user.

2. The desktop display stand base of claim 1, wherein a containing space is formed in the seat body, and the wireless charging device is accommodated in the containing space when the wireless charging device and the seat body are folded; the wireless charging device is hinged to a side wall of the containing space, the side of which close to the user.

3. A desktop display stand assembly, comprising the fixing device connected to the desktop, the display stand and the seat body respectively connected to the fixing device and the display stand, wherein the desktop display stand assembly further comprises the desktop display stand base according to claim 2.

4. The desktop display stand base of claim 1, wherein the shape of a containing space in the seat body is circular, and the bottom plate of the wireless charging module is of circular shape correspondingly.

5. A desktop display stand assembly, comprising the fixing device connected to the desktop, the display stand and the seat body respectively connected to the fixing device and the display stand, wherein the desktop display stand assembly further comprises the desktop display stand base according to claim 4.

6. A desktop display stand assembly, comprising the fixing device connected to the desktop, the display stand and the seat body respectively connected to the fixing device and the display stand, wherein the desktop display stand assembly further comprises the desktop display stand base according to claim 1.

7. A desktop display stand assembly, comprising the fixing device connected to the desktop, the display stand and the seat body respectively connected to the fixing device and the display stand, wherein the desktop display stand assembly further comprises the desktop display stand base according to claim 1.

8. A desktop display stand base, comprising: a fixing device connected to a desktop and a seat body respectively connected to the fixing device and a display stand, wherein a wireless charging device for mobile phones is provided on one side of the seat body, the side of which close to a user;

the wireless charging device is hinged to the seat body and can be locked at any angle, and the hinge point is locatable on the side close to the user; the wireless charing device comprises a bottom plate and a wireless charging module; the bottom plate comprises a bottom board and a side surrounding plate which is enclosed into a circle along the edge of the bottom board and is integrally connected with a edge of the bottom board; the bottom board and the side surrounding plate form a concave cavity; the wireless charging module is embedded in the concave cavity, and the bottom plate is rotationally connected with the seat body; and a power wire of the wireless charging module at a connection point of a rotation connection is connected with the power supply after sequently passing through a side wall of the bottom plate and an inner space of the seat body.

9. A desktop display stand assembly, comprising the fixing device connected to the desktop, the display stand and the seat body respectively connected to the fixing device and the display stand, wherein the desktop display stand assembly further comprises the desktop display stand base according to claim 8.

\* \* \* \* \*